United States Patent [19]

Hendry

[11] Patent Number: 4,781,554

[45] Date of Patent: Nov. 1, 1988

[54] APPARATUS FOR THE INJECTION MOLDING OF THERMOPLASTICS

[75] Inventor: James W. Hendry, Spring Hill, Fla.

[73] Assignee: Michael Ladney, Sterling Heights, Mich.

[21] Appl. No.: 71,363

[22] Filed: Jul. 9, 1987

[51] Int. Cl.[4] .............................................. B29C 45/16
[52] U.S. Cl. .................................... 425/4 R; 264/45.1;
264/537; 264/572; 425/130; 425/562; 425/564;
425/584; 425/817 R
[58] Field of Search ...................... 264/45.1, 537, 572;
425/130, 535, 536, 542, 549, 557, 562, 563, 564,
566, 568, 570, 571, 584, 559 817 R, 4 R

[56] References Cited

U.S. PATENT DOCUMENTS

| 2,940,123 | 7/1958 | Beck et al. | 425/170 |
| 3,966,372 | 6/1976 | Yasuike et al. | 425/817 R |
| 4,082,226 | 4/1978 | Appleman et al. | 425/564 |
| 4,101,617 | 7/1978 | Friederich | 425/533 |
| 4,106,887 | 8/1978 | Yasuike et al. | 425/535 |
| 4,129,635 | 12/1978 | Yasuike et al. | 264/51 |
| 4,140,672 | 2/1979 | Kataoka | 264/45.1 |
| 4,333,608 | 6/1982 | Hendry | 239/118 |

FOREIGN PATENT DOCUMENTS 1929343 12/1970 Fed. Rep. of Germany .

Primary Examiner—Jay H. Woo
Assistant Examiner—Timothy W. Heitbrink
Attorney, Agent, or Firm—Brooks & Kushman

[57] ABSTRACT

A nozzle for the injection molding of thermoplastic materials includes a nozzle body having a first bore for establishing a flow path for a molten thermoplastic. A first end of the nozzle body is adapted for fluid connection with a sprue of an associated mold body, and a second end thereof is adapted for fluid connection with an end of an associated injection molding machine. The nozzle body also includes a second bore. A first valve assembly, which is adapted for reciprocating movement in the nozzle body second bore, is provided to control the flow of plastic through the nozzle body. The first valve member includes a body having a tip portion and a fluid passage formed in the body and open at one end through the tip portion. A connection member is provided for communicating the valve body fluid passage with an associated source of pressurized fluid. An actuator member is provided for selectively actuating the first valve member to a closed position thereby preventing the flow of plastic through the nozzle body. A second valve assembly is provided for preventing the flow of plastic through the valve body fluid passage and for regulating the flow of pressurized fluid in both directions through the valve body fluid passage.

20 Claims, 5 Drawing Sheets

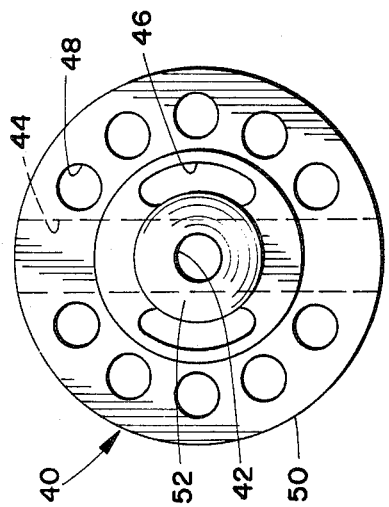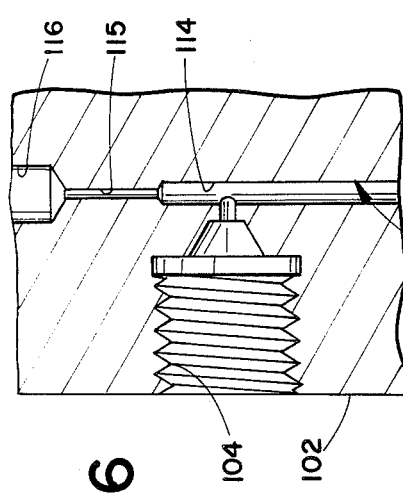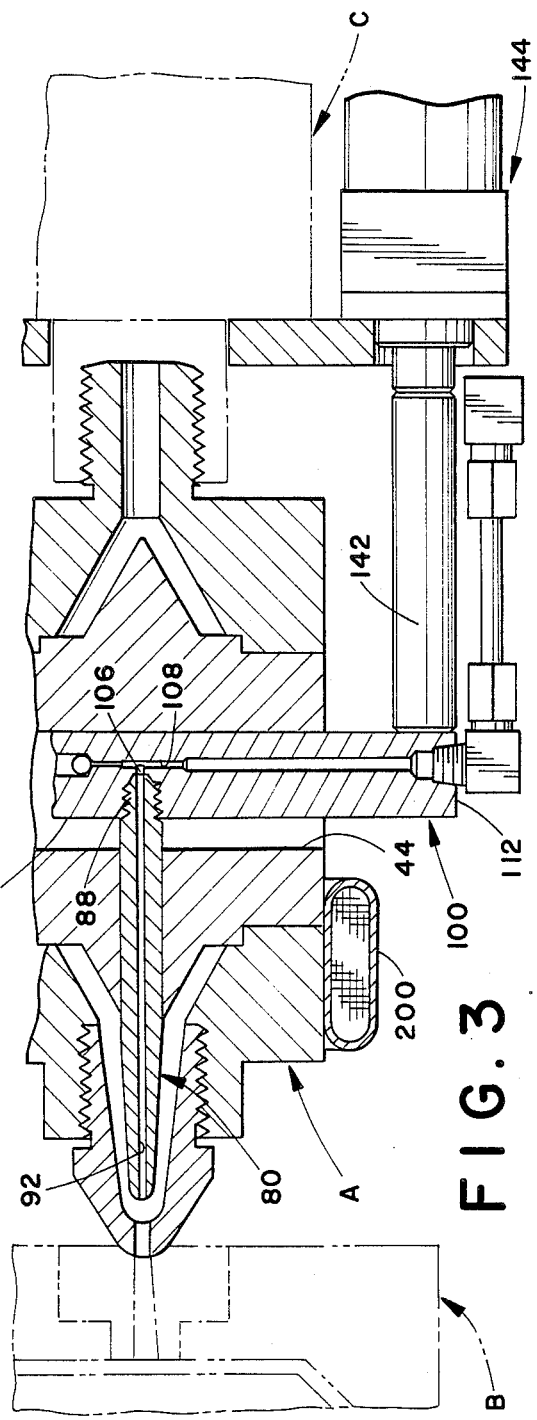

APPARATUS FOR THE INJECTION MOLDING OF THERMOPLASTICS

CROSS-REFERENCE TO RELATED APPLICATIONS

This application is related to United States patent applications entitled "Variable Volume Reservoir and Method for Its Use", U.S. Ser. No. 071,377 filed July 9, 1987 and "Gas Cylinder Piston Seal", U.S. Ser. No. 005,022 filed Jan. 20, 1987, both of which have the same Assignee as the present invention.

BACKGROUND OF THE INVENTION

This invention generally pertains to an apparatus and method for injection molding thermoplastic materials. More specifically, the present invention relates to a shut-off nozzle for the injection molding of molten thermoplastic materials in which a pressurized fluid is introduced into the thermoplastic mass during the injection process. The invention also relates to a method for injection molding.

The invention is particularly applicable to nozzles in which a needle valve, that regulates the flow of molten plastic through the nozzle, is also provided with a bore for injecting a gas under high pressure into a molten plastic stream as it enters a mold sprue and a mold space. However, it will be appreciated by those skilled in the art that the invention has broader applications and may also be adapted for use in many other injection molding environments.

It has become known that it is advantageous to urge molten thermoplastic material in an injection mold outwardly into contact with the mold surfaces by exerting pressure on the plastic material. This aids the external surface of the plastic material in assuming the precise shape dictated by the mold surface. The pressure also assists the filling of the mold space with molten plastic even if the space is elongated or narrow and is normally difficult to fill. Such pressure can be applied by a fluid which is injected into the plastic material in the mold space. This is advantageous since the molded part produced utilizes somewhat less plastic material and is lighter than if the part were solid plastic. More importantly, the plastic will not have a tendency to shrink away from the mold walls during cooling since an internal fluid pressure will keep it expanded against the walls. In previously used injection molding processes, the plastic in the mold space was kept under pressure while it was cooling down, by keeping the screw ram of the injection molding machine in operation to keep urging plastic into the mold cavity, but this introduced unwanted stresses in the part produced.

In fluid injection molding, articles are produced by injecting molten thermoplastic into a mold cavity and charging a body of pressurized fluid thereinto to form a hollow portion in the injected thermoplastic material. The fluid used may be gas, liquid, or low molecular weight polymer. For example, the gas may be a gaseous nitrogen and the liquid may be water that is heated and pressurized. A pressure is maintained on the fluid in the hollow fluid space within the molded object until the thermoplastic material in the mold cavity has set. Thereafter, the pressurized fluid is released from the molded part hollow area and the molded part can then be taken out of the mold cavity.

It is required to control the inlet passage to the mold cavity so that the thermoplastic is positively charged into the mold cavity and the pressurized fluid is similarly positively charged into the thermoplastic material. Such charging is conventionally done by a valve assembly which has a needle valve to control the flow of the thermoplastic material. Several of the conventional needle valves include a central bore which allows pressurized fluid to flow into the thermoplastic material that has already entered the mold sprue and the mold space.

However, the conventional valve assemblies are disadvantageous in that they are complicated in design, sometimes do not prevent the reverse flow of molten thermoplastic material down the pressurized fluid bore in the needle valve, and also do not allow the venting of the pressurized fluid from the interior of the molded body, after it has cooled, back through the needle valve. Moreover, the conventional valve assemblies do not allow a strong and positive control of the actuation of the needle valve nor do they provide suitable valve means for positively controlling the flow of pressurized fluid in both directions through the needle valve bore.

Accordingly, it has been considered desirable to develop a new and improved nozzle of the injection molding of thermoplastic materials as well as a method for utilizing such nozzle which would overcome the foregoing difficulties and others while providing better and more advantageous overall results.

BRIEF SUMMARY OF THE INVENTION

In accordance with the present invention, a new and improved nozzle for the injection molding of thermoplastics is provided.

More particularly in accordance with the invention, the nozzle includes a nozzle body having a first bore for establishing a flow path for the molten thermoplastic and a second bore. A first end of the nozzle body is adapted for fluid connection with a sprue of an associated mold body and a second end thereof is adapted for fluid connection with an end of an associated injection molding machine. A first valve means is adapted for reciprocating movement in the nozzle body second bore to control the flow of plastic through the nozzle body. The first valve means includes a body having a tip portion and a fluid passage formed in the body and open at one end through the tip portion. A connection means is adapted for communicating the valve body fluid passage with an associated source of pressurized fluid. An actuator means is provided for selectively actuating the first valve means to a closed position thereby preventing the flow of plastic through the nozzle body. Second valve means are provided for preventing the flow of plastic through the valve body fluid passage and for regulating the flow of pressurized fluid in both directions through the valve body fluid passage.

In accordance with another aspect of the invention, the connection means comprises an actuator bar which is oriented generally normal to the valve body. Preferably, the valve body comprises a needle valve having an elongated body with first and second ends and wherein the fluid passage extends longitudinally through the elongated body. Preferably the nozzle further comprises a securing means for securing the needle valve to the actuator bar. A fluid passage extends longitudinally through the actuator bar and the needle valve fluid passage communicates with the actuator bar fluid passage.

In accordance with still another aspect of the invention, the actuator means comprises a piston and cylinder assembly operably connected at one end to the actuator bar. Preferably, the second valve means are positioned in the actuator bar fluid passage.

In accordance with yet another aspect of the invention, the second valve means comprises a first check valve and a second check valve spaced from the first check valve. Preferably, the first check valve is resiliently biased to the closed position and the second valve means further comprises an adjusting means for modifying the force with which the first check valve is resiliently biased to the closed position.

According to another aspect of the invention, the connector means comprises a fluid line.

According to a further aspect of the invention, an apparatus for molding a pastic part is provided.

More particularly in accordance with this aspect of this invention, the mold assembly includes an injection molding machine which is adapted for injecting flowable plastics, and a mold body including a mold cavity adapted for receiving a flowable plastic from the injection molding machine. The mold body includes a sprue communicating with the mold body cavity. A nozzle body is secured between the mold body and the molding machine and includes a first bore and a flow path means defined in the nozzle body for establishing a path for the flowable plastic from the molding machine to the mold body sprue. A first valve means is provided for controlling the flow of plastic through the nozzle body flow path means. The first valve means includes a valve body having first and second ends and a fluid passage formed therein and extending between said ends. The fluid passage is open on one end to the mold body sprue. The first valve means is reciprocably mounted in the nozzle body first bore. A source of pressurized fluid is provided which is adapted to be injected into the mold cavity through another end of the valve body fluid passage. Actuator means are provided for actuating the valve body to a closed position thereby preventing the flow of plastic through the nozzle body and into the mold body cavity but still allowing the pressurized fluid to flow into the mold body cavity. Regulating means are provided for controlling the flow of plastic and the flow of pressurized fluid through the valve body fluid passage. The regulating means comprises first and second check valve which regulate the flow of pressurized fluid in both directions through the valve body fluid passage and prevent the flow of plastic through the valve body fluid passage. A pressure equilization line connects the upstream end of the first check valve and the downstream end of the second check valve.

According to still another aspect of the invention, the actuator means comprises an actuator bar adapted for extending through a second bore of the nozzle body. The valve body is secured at its second end to the actuator bar. A fluid passage is provided in the actuator bar with the valve body fluid passage being in fluid communication with the actuator bar fluid passage. At least one piston and cylinder assembly is operatively connected at one end to a portion of the actuator bar and is adapted to move the actuator bar and thus the valve body.

According to yet another aspect of the invention, the actuator bar is oriented generally normal to a longitudinal axis of the nozzle body and extends past the opposing side faces of the nozzle body. The piston and cylinder assembly is operatively connected at the one end to a portion of the actuator bar extending past a side face of the nozzle body.

According still yet another aspect of the invention, the first and second check valves are positioned in the actuator bar fluid passage. Preferably, the actuator bar fluid passage has varying diameters such that a first fluid passage section extending from the valve body fluid passage to the first spring biased check valve has a relatively small diameter and a second fluid passage section extending from the valve body fluid passage to the second check valve has a relatively large diameter.

A still further aspect of the invention relates to a method for molding thermoplastic material.

More particularly, the method comprises the steps of providing a nozzle body, through which thermoplastic material flows, with a valve member having a bore through which a fluid flows. A mold space into which the thermoplastic material flows is communicated with the nozzle body. The valve member is actuated to allow thermoplastic material to flow through the nozzle body into the mold space. Subsequently, fluid is allowed to flow through the valve member bore into the thermoplastic material in the mold space to form a fluid cavity therein. The valve member is then actuated to terminate the flow of thermoplastic material through the nozzle body. However, fluid continues to be allowed to flow through the valve member bore and into the fluid cavity. Subsequently, the fluid is vented from the fluid cavity through the valve member bore.

According to a yet further aspect of the invention, the method comprises the further step of preventing the thermoplastic material from flowing through the valve member bore.

According to a still further aspect of the invention, the method further comprises the step of reducing the pressure of the fluid in the fluid cavity during the step of continuing to allow fluid to flow.

One advantage of the present invention is the provision of a new and improved nozzle assembly used in the injection molding of thermoplastics.

Another advantage of the present invention is the provision of a gas injection molding nozzle having a needle valve which is actuated by an actuator bar that is positively controlled by a piston and cylinder assembly.

Still another advantage of the present invention is the provision of a nozzle assembly comprising a first valve means for regulating the flow of molten thermoplastic and a second valve means for preventing the flow of plastic through the valve body and for regulating the flow of pressurized fluid through the valve body in both directions.

Yet another advantage of the present invention is the provision of a method for molding thermoplastic material.

Still other benefits and advantages of the invention will become apparent to those skilled in the art upon a reading and understanding of the following detailed specification.

BRIEF DESCRIPTION OF DRAWINGS

The invention may take physical form in certain parts and arrangements of parts, a preferred embodiment of which will be described in detail in this specification and illustrated in the accompanying drawings which form a part hereof and wherein:

FIG. 3 is a side elevational cross-sectional view of part of the nozzle assembly of FIG. 2 showing the valve body thereof in a second position;

FIG. 4 is an end elevational view of a center section of the nozzle of FIG. 1;

FIG. 6 is a greatly enlarged side elevational view in cross-section of a center portion of the actuator bar of FIG. 5; and, FIG. 7 is a schematic view of one pressurized fluid circuit which can be associated with the valve body of the nozzle assembly of FIG. 1.

DETAILED DESCRIPTION OF THE PREFERRED EMBODIMENT

Figure 2:
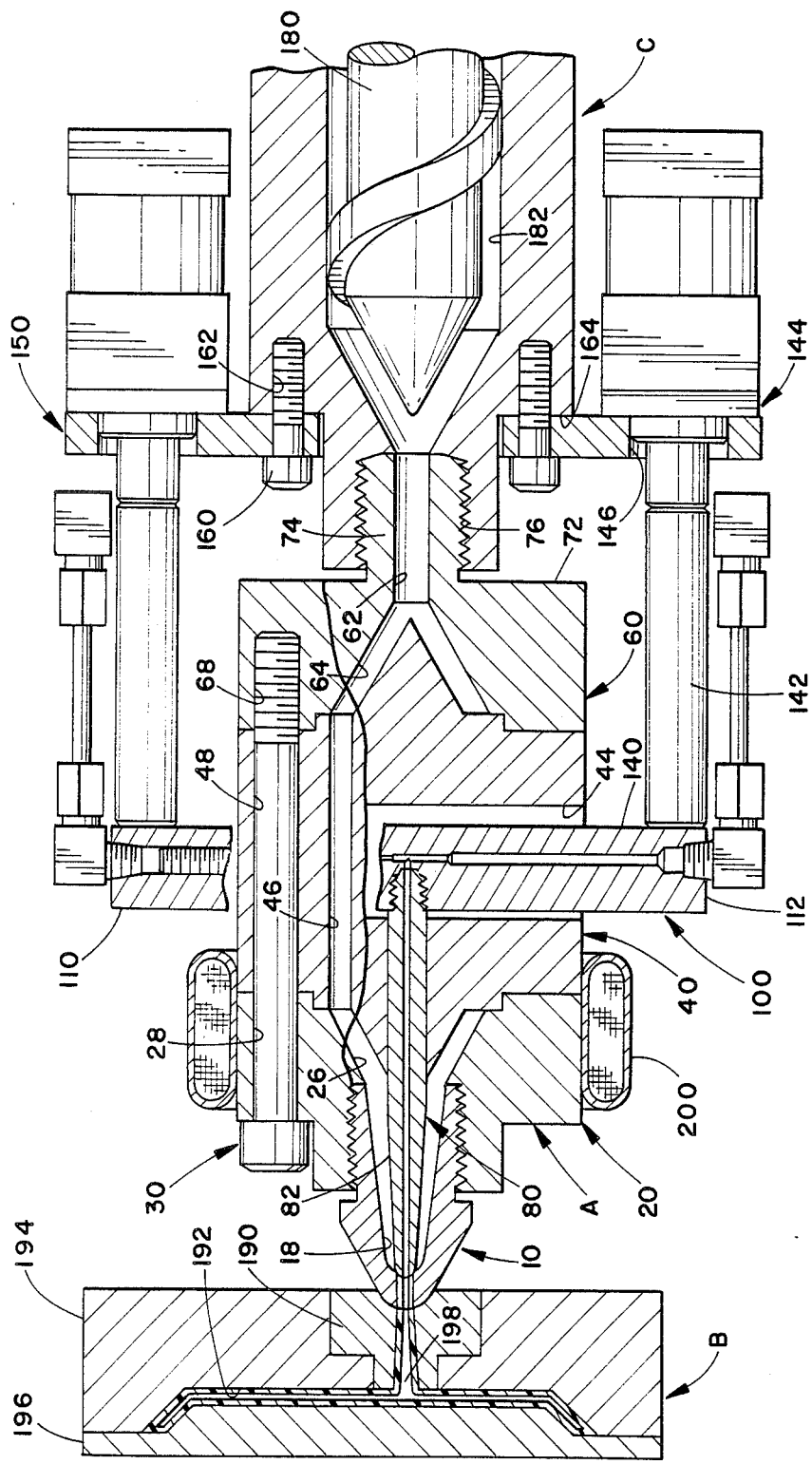
FIG. 2 is a side elevational view in cross-section of the nozzle assembly of FIG. 1 connected between a mold body and a screw ram of an injection molding apparatus with a valve body thereof being in a first position.

Referring now to the drawings, wherein the showings are for purposes of illustrating a preferred embodiment of the present invention and not for purposes of limiting same, FIG. 2 shows the subject new nozzle assembly A connected between a mold body B and a screw ram assembly C of an injection molding apparatus. While the system is primarily designed for plastic injection and will hereinafter be described in connection with a nozzle assembly used in the injection of a gas at a mold space sprue, it will be appreciated that the overall inventive concept could be adapted to other types of nozzle assemblies as well.

Figure 1:
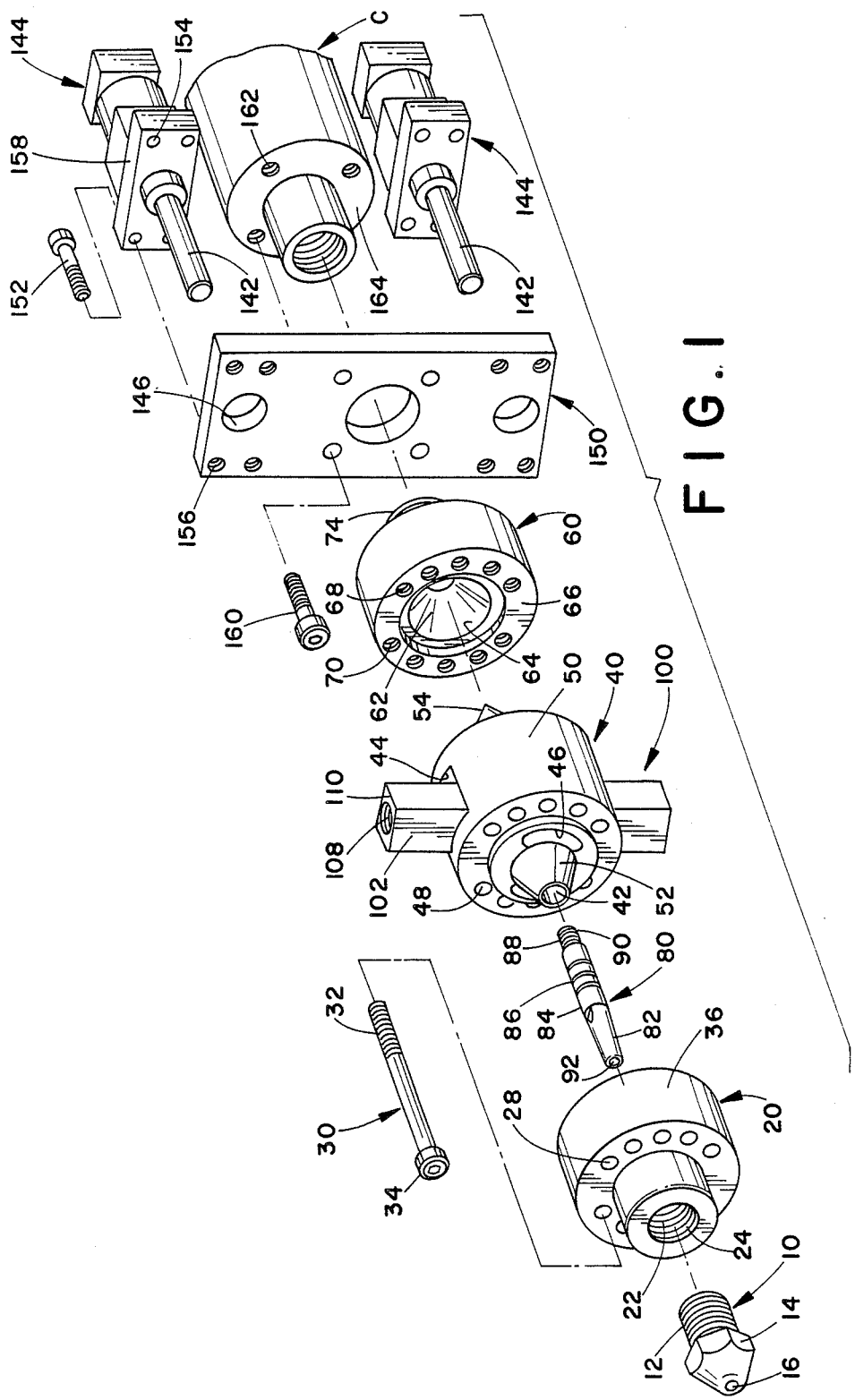
FIG. 1 is an exploded perspective view of a nozzle assembly for an injection molding apparatus according to the preferred embodiment of the present invention together with a portion of an associated injection molding apparatus.

With reference now to FIG. 1, the shut-off nozzle comprises a tip member 10 which has a threaded body portion 12 as well as a hex head 14. A longitudinal bore 16 having an outwardly flaring section 18 (FIG. 2) extends through the tip member 10. Adjacent the tip member is an adapter head or first nozzle section 20 which is provided with a longitudinal bore 22 that has a first threaded portion 24 into which the threaded body 12 of the tip 10 may be advanced. With reference now again to FIG. 2, it can be seen that the longitudinal bore 22 of the first nozzle section has a second bore section 26 which has an expanded conical cross-section. The first nozzle section 20 is also provided with a plurality of spaced longitudinally extending apertures 28 which are spaced radially outwardly of the bore 22 and are adapted to hold a plurality of fasteners 30, only one of which is illustrated in FIG. 1. The fasteners each have a threaded distal end 32 and a headed proximal end 34. The first nozzle section has a substantially circular outer periphery 36 in the preferred embodiment, although any other suitable outer periphery could be provided for the section.

A main body or second nozzle section 40 is provided adjacent the first section 20. A first bore 42 extends in the second section 40 along the longitudinal axis of the body and terminates in a second bore 44 that is transverse to the longitudinal axis of the body and extends therethrough. With reference now also to FIG. 4, a pair of third bores 46 which are sausage-shaped in cross-section and which are parallel to each other and to the longitudinal axis of the body 40 and are spaced from the first bore 42 are also provided. The second nozzle section 40 has a plurality of fastener apertures 48 which are aligned with the fastener apertures 28 provided in the first nozzle section 20 so that the plurality of fasteners 30 can extend therethrough. The second nozzle section also has a substantially circular outer periphery 50 but has a tapering front end 52, through which the first bore 42 exits, and a tapered rear end 54 (FIG. 1).

The nozzle body also includes a transition part or third nozzle section 60 that has a longitudinal bore 62 extending therethrough. The bore has an expanded conical section 64 which faces the second nozzle section 40 and into which the tapered rear end 54 of the second nozzle section can be seated. Extending into the third nozzle section from a front face 66 thereof are a plurality of spaced fastener apertures 68 each of which is suitably threaded as at 70 in order to enable each of the plurality of fasteners 30 to be secured therein by the threaded end 32 thereof. The apertures 68 are aligned with the fastener apertures 48 of the second section 40. With reference now again to FIG. 2, a rear face 72 of the third nozzle section is provided with a stem section 74 which has a suitably threaded outer periphery 76 that can cooperate with a suitable aperture in the injection molding machine C.

Positioned in the nozzle body A for reciprocation is a first valve means which can be an elongated valve body 80 that can also be termed a needle valve. The body includes a tapered front end 82 which fits in the outwardly flaring section 18 of the tip bore 16. The valve body also has a main section 84 that is provided with suitable peripheral grooves 86 (shown only in FIG. 1) into which conventional seal elements such as O-rings (not illustrated) can be seated to prevent fluid flow between the body 80 and the second nozzle section 40 when the body is seated in the second nozzle section first bore 42 as illustrated in FIG. 2. A reduced diameter rear section 88 of the body 80 is provided with a threaded periphery 90. A substantially longitudinal bore 92 extends through the body 80 from the tapered front end to the reduced diameter rear section.

As shown in FIG. 3, positioned adjacent the valve body 80 is an actuator bar 100 that has provided in a front face 102 thereof a suitable threaded bore 104 (see FIG. 6) into which the reduced diameter rear section 88 of the valve body 80 can be threaded. When the body 80 is secured to the bar 100, the bore 92 thereof communicates with a first bore 106 of the bar. A second bore 108 extends from a top wall 110 (FIG. 2) to a bottom wall 112 of the actuator bar and communicates with the first bore 106.

Figure 5:
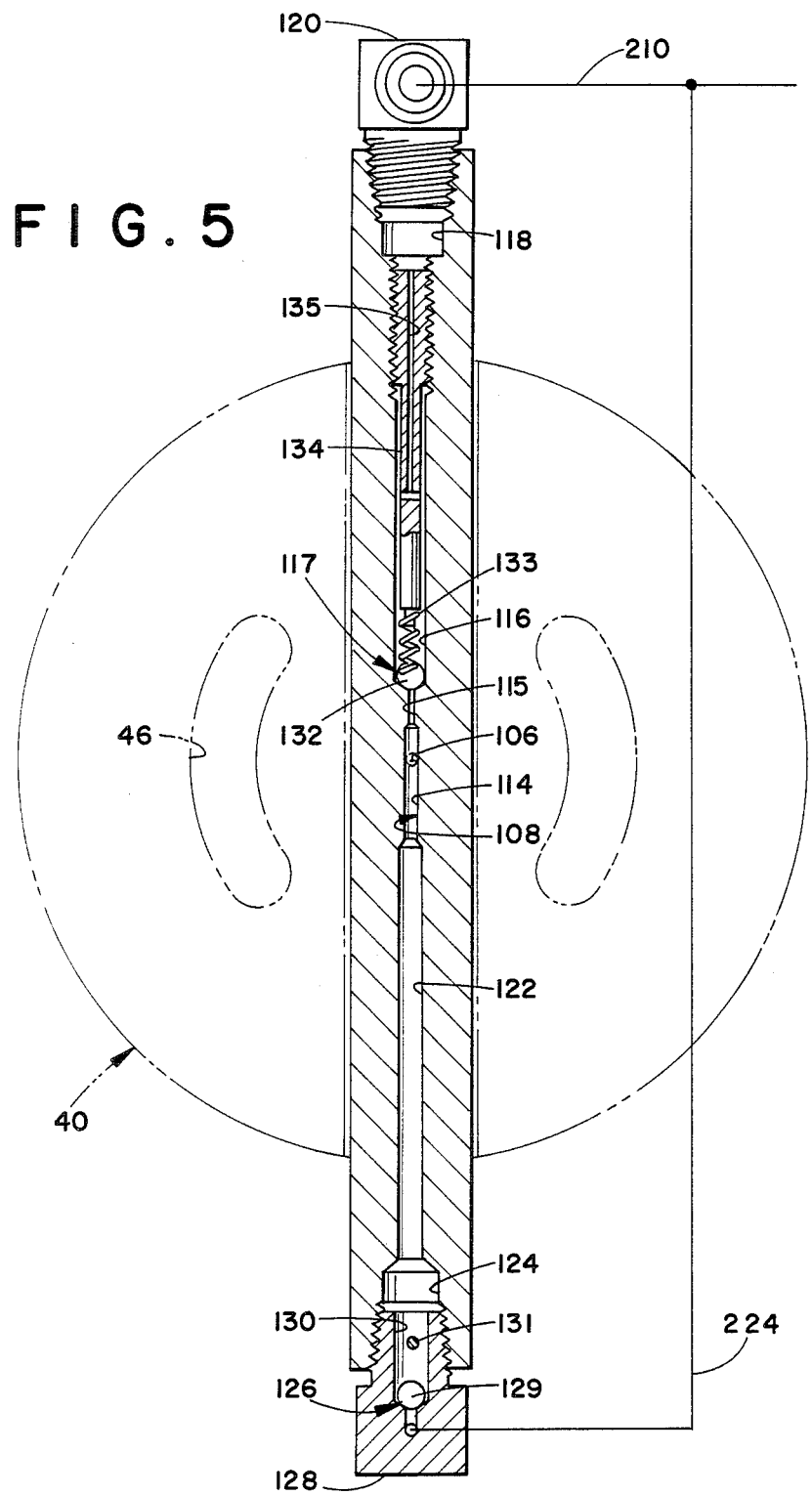
FIG. 5 is an end elevational view in cross-section of an actuator bar of FIG. 1 shown as it extends through the center section of the nozzle of FIG. 1.

With reference now also to FIG. 5, the second bore 108 has a first section 114 which communicates with the first bore 106 and leads, at its first end, to a reduced diameter second bore section 115, which in turn, communicates with an enlarged diameter third bore section 116 that houses a first valve means 117. A fourth bore section 118 communicates with the third bore section 116 and is suitably configured so that a first connector element or fitting 120 can be threaded therein. The second bore 108 also includes a fifth section 122 which leads from the other end of the first section 114 to a sixth bore section 124 in which is positioned a second valve means 126. If desired, the second valve means can be located in a second connector element or fitting 128 which is suitably configured so as to be threadable in the sixth bore section 124. The second valve means can be a ball member 129 which is limited in its upward movement in a chamber 130 in the fitting 128 by a bar 131 that extends across the chamber.

The first valve means 117 is preferably a spring biased ball check valve including a ball member 132 and a biasing spring 133. The force with which the spring urges the ball against the adjacent sealing surface (preferably between 10-50 psi., 68.95-344.75 KPa, 0.68-3.41 bars) can be varied by a threaded adjustment of a rod 134 which can be threadedly advanced in the third bore section 116. In order to allow gas to act on the ball member 132, a suitable bore 135 is provided in the rod 134 so that gas can flow therethrough. The rod is provided at its upper end with a suitable conventional driving means, such as a screwdriver slot (not illustrated).

With reference now again to FIG. 3, a rear face 140 of the actuator bar 100 is adapted to be contacted by a piston 142 of a piston and cylinder assembly 144. With reference now also to FIG. 1, preferably the piston extends through a suitable aperture 146 in a plate member 150. The piston and cylinder assembly 144 is secured to the plate member 150 by suitable conventional fasteners 152 which extend through aligned apertures 154, 156 in a body 158 of the assembly and the plate 150, respectively. The plate 150 in turn secures the piston and cylinder assembly 144 to the injection molding machine C. Suitable fasteners 160 extend into threaded apertures 162 provided on a front face 164 of the screw ram body 166 to secure the plate member 150 and hence the piston and cylinder assembly 144 to the injection molding machine C.

The piston and cylinder assembly 144 is in fluid contact with a suitable source of pressurized fluid which is controlld by a suitable conventional valve element. Thus the extension of the piston rod 142 is controlled by the valve which selectively allows pressurized fluid to move the piston. Preferably, two piston and cylinder assemblies are provided one adjacent each end of the bar 100 as illustrated in FIG. 1. Extension of the piston rods 142 causes the movement of the actuator bar 100 and hence the valve body 80 forward in order to close off the bore 16 in the tip 10 as is illustrated in FIG. 2. When the valve body 80 is moved forward, the flow of thermoplastic material from the injection molding machine C through the nozzle body A and into the mold body B is cut off.

With reference now to FIG. 2, when it is desired to allow thermoplastic material to flow into the mold body B, a hydraulic screw ram 180 of the injection molding machine C is actuated thereby pressurizing a suitable type of fluid thermoplastic material (not illustrated for simplicity) which is then caused to flow through a bore 182 of the machine and into the longitudinal bore 62 of the third nozzle section. The fluid thermoplastic material then flows into the expanded section 64 of the bore 62 and from there into the sausage-shaped third bores 46 of the second nozzle section 40. The fluid thermoplastic material then flows through the sausage-shaped bores and into the expanded section 26 of the longitudinal bore 22 of the first nozzle section 20. At this point, the pressurized thermoplastic material will act on the needle valve 80 and urge it away from the tip section 10. In order for this to take place, the pressurized fluid in the cylinder bore of the piston and cylinder assembly 144 is vented through its valve. When this is done, there is no pressure holding the actuator bar 100 against movment towards the rear.

Such movement is initiated by the needle valve 80 as it is urged towards the rear by the force of the pressurized thermoplastic material acting against the tapered surface 82 of the valve. When this happens, the bore 16 in the tip 10 is opened and the thermoplastic material is allowed to flow into a sprue 190 of the mold body B. The thermoplastic material then flows into a mold chamber 192 located between a pair of mold halves 194, 196 of the mold body B.

After the thermoplastic material has begun to flow into the sprue, a pressurized fluid is then allowed to flow through the bore 92 of the needle valve 80 to create a fluid cavity 198 in the thermoplastic material flowing into the mold cavity 192.

In order to keep the thermoplastic material in a molten state as it flows through the nozzle body A, one or more electric heater elements 200 can be affixed around the outer periphery of the nozzle body as illustrated in FIG. 3.

Figure 7:
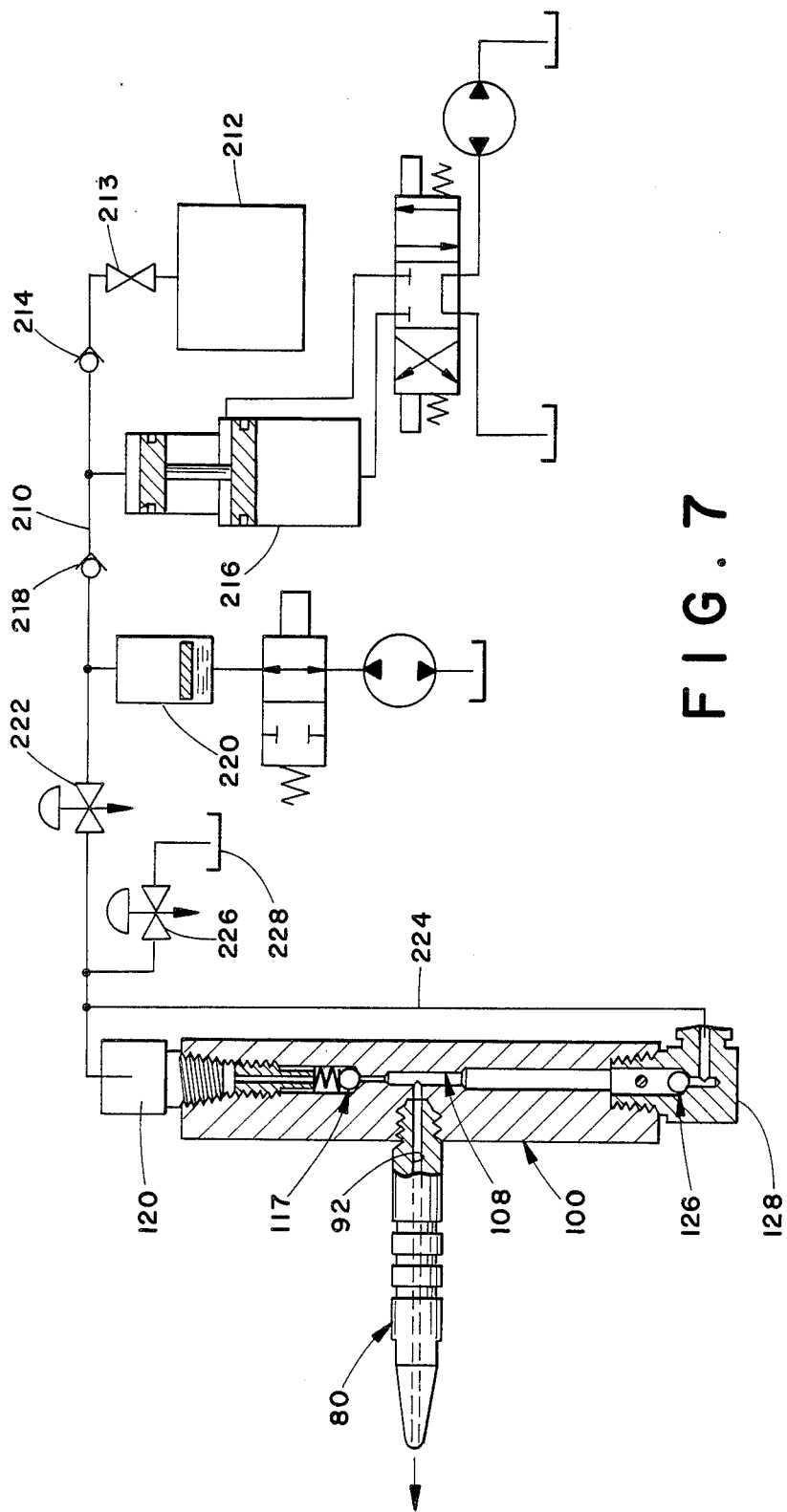

With reference now to FIG. 7, it can be seen that such pressurized fluid can be provided for the needle valve 80 through a pressurized fluid line 210. One suitable way of providing such pressurized fluid is by allowing a conventional source of fluid, such as a tank 212 of a suitable neutral gas, such as nitrogen, or another suitable fluid, upon the opening of a valve 213, to flow through a check valve 214 into a suitable pressurizing pump 216, which may be a reciprocating piston compressor or the like. The fluid which is thus pressurized cannot flow back through the first check valve 214 but can flow through a second check valve 218 and into a pressurized fluid reservoir 220. When an adequate amount of pressurized fluid is collected in the reservoir 220, then the injection molding process of the thermoplastic material can begin.

As the pressurized fluid in the reservoir 220 is called for, a fluid supply valve 222 can be opened in any conventional manner, such as by an air operator, to allow pressurized fluid to flow through line 210 and through a line 24 into the second bore 108 of the actuator bar 100 past the second check valve 126 thereof. The line 224 is provided in order to equalize pressures between the ends of the bar 100. This fluid line 224 may be bored in the actuator bar 100 if desired or can be an external line as is illustrated in FIGS. 5 and 7. The pressurized fluid then flows through the bore 92 in the valve body 80 and into the thermoplastic material. If desired a suitable conventional line filter (not illustrated) may be provided in the fluid line 210 at any desired location.

When an adequate amount of thermoplastic material has been charged into the mold cavity 192, the piston and cylinder assembly 144 can be actuated by providing pressurized fluid thereto. With reference now again to FIG. 2, this will actuate the pistons 142 to move forward and push the actuator bar 100 forward. Such movement of the actuator bar will, of course, move the valve body 80 forward into a sealing relationship with the tip member 10 thereby shutting off the flow of thermoplastic material through the tip bore 16. However, the flow of pressurized fluid through the bore 92 in the valve body 80 and through the tip bore 16 can continue unabated even after the flow of thermoplastic material is stopped.

In order to prevent the still fluid portion of the theromplastic material from flowing back through the bore 92 and the valve body and thence through the second bore 108 in the actuator bar, the actuator bar is provided with the first and second check valves 117, 126 as well as the different diameters of the various bore sections of the second bore 108 as illustrated in FIG. 5. In this connection, preferably the second section 115 of the second bore 108 can have a relatively small diameter on the order of approximately, 0.015 inches (0.038 cm), whereas the fifth section 122 of the second bore 108 can have a relatively large diameter of approximately 0.060 inches (0.152 cm). This sizing of bore diameters will allow the thermoplastic material to flow readily into the fifth bore section but flow only with great difficulty into the second bore section since the fairly high viscosity of the thermoplastic material will retard the flow through the relatively narrow second bore section 115. But flow of the thermoplastic material through the fifth bore section 122 is prevented by the second check valve 126, which is preferably a ball-type valve as illustrated. Also, the flow of thermoplastic through the second bore section 115, is prevented by the pressure of the pressurized fluid behind the valve 117 as well as by the resilient biasing of the valve 117.

Therefore, the flow of thermoplastic material back through the actuator bar is prevented. On the other hand, the flow of pressurized fluid through the bore 108 of the actuator bar is allowed in either direction. Pressurized fluid can flow from the fluid lines 210 and 224 through the second check valve 126, through the lower half of the bore 108 and into the valve body bore 92. The venting of pressurized fluid through the first check valve 117 is described hereinbelow. For the pressurized fluid to flow through the actuator bar second bore 108 and into the needle valve bore 92, all that is needed is the pressurization of the fluid to a higher pressure than the thermoplastic material at the sprue 190.

When the thermoplastic material has cooled down and set in the mold cavity, the pressurized fluid in the fluid cavity 198 in the molded product D that has been produced in the mold cavity B can be vented back through the needle valve and the actuator bar by the provision of a suitable valve means. In the present embodiment, the first valve means 117 in the actuator bar 100 is a check valve than can be actuated by a fairly low gas pressure. As mentioned, the first valve 117 can be opened by a pressure on the order of 10 to 50 psi (69-345 kPa, or 0.69-3.45 bars). When the fluid valve 222 is closed, trapping pressurized fluid at a relatively high pressure in line 210 behind the valve 222, a second fluid valve 226 which is in fluid connection with the line 210 can be opened thereby venting the pressured fluid in the line 210 into a vented reservoir 228 or the atmosphere, if desired. Now the pressure in the fluid cavity 198 in the molded part D and hence in the bore 92 of the needle valve and the bore 108 of the actuator bar 100 is higher than the pressure in this section of line 210. If the fluid pressure is suitably higher than the actuation point of the first check valve 117, the valve will be opened against the resilient bias of the spring 133 and pressurized fluid will then flow from the fluid cavity 198 through the bore 92 and the second bore 108 of the actuator bar through the first fitting 120 and into the fluid line 210 and thence into the reservoir 228 or to the atmosphere, if desired.

With continuing reference to FIG. 7, one particularly advantageous way of providing pressurized fluid during the gas injection molding process is as follows. A stream of molten thermoplastic material is introduced into the mold cavity 192 through the sprue 190 at a relatively constant first pressure. This pressure may be on the order of approximately 1,500 psi (10,342.5 KPa, or 103.43 bars). Meanwhile, a quantity of a pressurized fluid, such as a neutral gas, e.g. nitrogen, is stored in the reservoir 220 at a second pressure which is at least as high as the first pressure. Preferably, the second pressure is approximately 2,200 psi (15,169 kPa or 151.69 bars). Thereafter, gas is introduced into the stream of molten plastic material immediately after the molten material has passed the position at which the gas is introduced. In the present instance, such gas is introduced as the first fluid valve 222 is opened and the pressurized fluid, i.e. nitrogen gas, can flow through the pressurized fluid lines 210 and 224, through the check valve 126 and the bores 108, 106 of the actuator bar 100 and through the bore 92 of the needle valve 80.

The gas forms a gas cavity or fluid cavity 198 in the molten thermoplastic material by exerting pressure on the surrounding plastic material to urge the molten portion of the material toward the surfaces of the mold space. As the thermoplastic material continues to be fed into the mold cavity 192 at approximately 1,500 psi. (10,342.5 kPa), the pressurized fluid continues to be injected into the gas cavity 198 at a pressure that decreases over time from the second pressure, i.e. 2,200 psi. (15,169 kPa), to a pressure value below the first pressure value.

It should be noted, however, that the pressure of the thermoplastic material at the mold sprue is going to be considerably less than the introduction pressure of the thermoplastic at the screw ram C because of the viscosity of the thermoplastic material. Whatever the pressure of the thermoplastic material may be at the mold sprue, the pressure of the pressurized fluid needs to be somewhat higher in order to prevent the thermoplastic material from flowing into the bore 92 of he needle valve 80 and blocking the flow of the pressurized fluid.

In order to decrease the pressure of the pressurized fluid flowing through the needle valve bore 92, all that needs to be done is to exhaust the pressurized fluid which is stored in storage container 220 without adding additional pressurized fluid thereto. It can be seen that the pressurized fluid can only flow from the storage container 220 into the fluid cavity 198 since the check valve 218 in the fluid line 210 prevents reverse flow. Additionally, since the second fluid valve 224 is closed at this time, fluid cannot flow into the vented reservoir 228 either.

Obviously, as the pressurized fluid is released from the storage container 220 the pressure of the fluid decreases according to the well known ideal gas equation law $PV = nRT$. Admittedly this equation applies only for ideal gases at relatively low pressures up to 100 to 200 psi. (689.5-1379 kPa), at temperatures which are considerably above the so-called "critical temperature" of the gas concerned (for most neutral gases this critical temperature is $-100°$ F. to $-300°$ F., $-73°$ to $-184°$ C.). However, for higher pressures, the van der Waals equations of state can be substituted for the pressure component of the above ideal gas equation. This modification of the ideal gas law does not change the basic relation between pressures, volumes, and temperatures. This relation essentially holds that as the volume of a gas increases the pressure will decrease if the temperature and the amount of gas stays essentially the same.

In the present instance as the volume of space which the gas can occupy increases, since the gas is being vented from the reservoir 220, the pressure of the gas will certainly decrease. However, the gas, which is stored at approximately room temperature, will encounter a heated thermoplastic material which is at considerably higher temperatures. Therefore, the temperature of the gas will increase and this will cause somewhat of a rise in the pressure of the gas. Therefore, the pressure of the gas will not rapidly decrease as the gas flows into the mold space and enlarges its volume, although it will decrease slowly.

After the supply of molten thermoplastic material to the mold space is terminated, then the pressure of the gas can decrease further to pressures which are lower than was the pressure of the thermoplastic material as it flowed through the sprue. As mentioned, the flow of molten plastic is terminated by actuating the bar 100 to urge the needle valve 80 forward and into contact with the bore walls of the tip 10. This interrupts the flow of molten plastic through the sausage-shaped third bores 46 of the second member 40 and into the bore 22 of the first member 20. Now it no longer matters if the thermoplastic material flows into the bore 92 of the needle valve 80 since the injection molding process is essentially completed and a continuous fluid cavity has been created in the molded part.

Gas continues, however, to flow into the mold cavity from the container 220. Such gas flow only stops when the pressure inside the fluid cavity 198 equals the pressure in the container 220. As the thermoplastic material in the mold cavity 192 cools, the pressure in the fluid cavity 198 decreases and the flow of gas continues from the container 220 into the fluid cavity until pressures are again equalized. After the cooling of the thermoplastic is complete, the same final pressure is obtained in the fluid cavity 198 and the container 220. This pressure may be on the order of approximately 400 to 500 psi (2758-2447.5 kPa).

As mentioned, the pressurized fluid at this pressure can be vented from the fluid line 210, as outlined above, into the vented reservoir 228 or the atmosphere by opening the second valve 226 and closing the first valve 222. The pressurized fluid now flows through the first check valve 117 by overcoming the resilient bias thereof. As such flow occurs, the pressure in the gas cavity 198 decreases until the check valve 117 is again resiliently biased closed at a pressure of approximately 10-50 psi (69-345 kPa). Thus only fluid at this low pressure remains trapped in the cavity 198. Thereafter, the mold body can be opened, for example by spacing the second mold body part 196 away from the first mold body part 194, to allow the molded part D to be taken out therefrom. Since only gas at a low pressure is trapped in the gas cavity 198 of the part produced, the nozzle A does not have to be separated from the mold body B to vent the gas from the gas cavity before the mold body halves are separated, as in the prior art. Previously, the two mold body halves could not be separated before the gas was vented from the gas cavity (by removing the nozzle A from the sprue 190) since otherwise the molded part would explode due to the gas trapped therein.

A part molding for which the process is particularly applicable is a molding having a large surface area which is supported by thicker ribbed areas. Pressurized fluid is injected into the molten plastic stream to form gas spaces inside each rib or the like thereby urge the molded plastic material against all the surfaces of the mold.

Any suitable type of plastic, such as polypropylene, polycarbone, polysulfone, polystyrene, polyethylene, ABS, etc. can be injected through the nozzle assembly described hereinabove.

The articles so produced can be used as structural components in forming automotive products such as consoles, dashboards, and the like; consumer products such as cabinets for home electronic components such as stereos and televisions; housing products such as shelving, and doors, or various items of furniture as well as in many other markets.

The invention has been described with reference to a preferred embodiment. Obviously, alterations and modifications will occur to others upon reading and understanding of this specification. It is intended to include all such modifications and alterations insofar as they come within the scope of the appended claims or the equivalents thereof.

What is claimed is:

1. A nozzle used in an apparatus for the injection molding of thermoplastics, comprising:
   a nozzle body including a first bore means for establishing a flow path for a molten thermoplastic, a first end of said nozzle body being adapted for fluid connection with an associated mold body, and a second end thereof being adapted for fluid connection with an end of an associated injection molding machine;
   first valve means for controlling the flow of plastic through said nozzle body, said first valve means including a valve body adapted for reciprocating movement, said nozzle body including a second bore means for housing said valve body, said valve body including a tip portion and a fluid passage formed in said valve body and open at one end through said tip portion;
   connection means adapted for communicating said valve body fluid passage with an associated source of pressurized fluid;
   actuator means including an actuator bar having a fluid passage extending therethrough for selectively actuating said valve body to a closed position thereby preventing the flow of plastic through said nozzle body; and
   second valve means including a first means for preventing the flow of plastic through said actuator bar fluid passage and, a second means for permitting the flow of pressurized fluid in both directions through said valve body fluid passage.

2. The nozzle of claim 1 wherein said actuator bar is oriented generally normal to said valve body.

3. The nozzle of claim 2 wherein said valve body comprises a needle valve having an elongated body with first and second ends and wherein said valve body fluid passage extends longitudinally through said elongated body.

4. The nozzle of claim 3 further comprising a securing means for securing said needle valve to said actuator bar, wherein said needle valve fluid passage communicates with said actuator bar fluid passage.

5. The nozzle of claim 4 wherein said second valve means is positioned in said actuator bar fluid passage, said actuator bar fluid passage having two ends and further comprising a pressure equalization line which connects the two ends of said actuator bar fluid passage.

6. The nozzle of claim 2 wherein said actuator means further includes a piston and cylinder assembly operatively associated at one end with said actuator bar.

7. The nozzle of claim 1 wherein said first means comprises a first check valve and said second means is a second check valve.

8. The nozzle of claim 7 wherein said first check valve comprises resilient means for biasing said first check valve to a closed position and further comprises adjusting means for modifying the force with which said first check valve is resiliently biased to the closed position.

9. The nozzle of claim 1 wherein said connector means comprises a fluid line.

10. A shut-off nozzle used in apparatus for the injection molding of fluidized thermoplastics, comprising:
 a nozzle body including a first bore for establishing a flow path for the fluid plastic, a first end of said nozzle body being adapted for fluid connection with a sprue of an associated mold body, and a second end thereof being adapted for fluid connection with an end of an associated injection molding machine, said nozzle body further comprising a second bore which communicates with said first bore and a third bore which communicates with said second bore;
 a needle valve adapted for reciprocating movement in said nozzle body second bore to control the flow of plastic through said nozzle body, said valve including a tip end, a base end, and a longitudinally extending bore open at one end through said tip end of said needle valve;
 an actuator bar adapted for extending through said nozzle body third bore, said needle valve being secured at said base end to said actuator bar, a fluid passage being provided in said actuator bar, said needle valve bore being in fluid communication with said actuator bar fluid passage;
 a source of pressurized fluid adapted to flow through said actuator bar fluid passage and said needle valve bore, said source being in fluid communication with said actuator bar fluid passage;
 an actuator mechanism for selectively moving said actuator bar and said needle valve to a closed position thereby preventing the flow of plastic through said nozzle body;
 a means for preventing the flow of plastic through said actuator bar fluid passage; and,
 a means for regulating the flow of pressurized fluid in both directions through said valve body fluid passage.

11. The nozzle of claim 10 wherein said actuator bar is oriented generally normal to a longitudinal axis of said nozzle body and extends past opposing side faces of said nozzle body.

12. The nozzle of claim 11 wherein said actuator mechanism comprises two spaced piston and cylinder assemblies each operatively contacting at one end a respective portion of said actuator bar extending past said nozzle body.

13. The nozzle of claim 10 wherein said means for preventing the flow of plastic and said means for regulating the flow of pressurized fluid are positioned in said actuator bar fluid passage.

14. The nozzle of claim 10 wherein said needle valve base end has a threaded outer periphery which is adapted to thread into a suitably threaded bore provided on said actuator bar, said needle valve bore extending through said needle valve base end to thereby be in fluid communication with said actuator bar fluid passage.

15. The nozzle of claim 10 wherein said nozzle body comprises:
 an adapter head;
 a main body;
 a transition part provided with a connection means for enabling a connection to be made with the associated injection molding machine; and,
 fastener means for securing said adapter head, main body, and transition part together.

16. An apparatus for molding a plastic part comprising:
 an injection molding machine adapted for plasticizing and discharging thermoplastic materials;
 a mold body including a mold cavity adapted for receiving a flowable thermoplastic from said injection molding machine, said mold body including a sprue communicating with said mold body cavity;
 a nozzle body, secured between said mold body and said molding machine and including a first bore and a flow path means defined in said nozzle body for establishing a path for the flowable thermoplastic from said molding machine to said mold body sprue;
 a first valve means for controlling the flow of plastic through said nozzle body flow path means, said first valve means including a fluid passage having first and second ends, said first end being open to said mold body sprue, said first valve means being reciprocably mounted in said nozzle body first bore;
 a source of pressurized fluid which is adapted to be injected into said mold cavity through said second end of said first valve means fluid passage;
 actuator means for actuating said valve body to a closed position thereby preventing the flow of plastic through said nozzle body and into said mold body cavity but still allowing said pressurized fluid to flow into said mold body cavity; and
 regulating means for preventing the flow of the flowable thermoplastic through said valve means fluid passage and controlling the flow of pressurized fluid through said valve means fluid passage in both directions, said regulating means comprising:
 a first check valve having an upstream end;
 a second check valve spaced from the first check valve and having a downstream end, and
 a fluid pressure equalization line connecting the upstream end of said first check valve and the downstream end of said second check valve.

17. The assembly of claim 16 wherein said actuator means comprises:
 an actuator bar adapted for extending through a second bore of said nozzle body, said valve means including a valve body having first and second ends and a fluid passage extending therebetween, said valve body being secured at its second end to said actuator bar, a fluid passage being provided in said actuator bar, said valve body fluid passage being in fluid communication with said actuator bar fluid passage; and,
 at least one piston and cylinder assembly operatively connected at one end to a portion of said actuator bar and adapted to move said actuator bar and thus said valve body.

18. The assembly of claim 17 wherein said actuator bar is oriented generally normal to a longitudinal axis of said nozzle body and extends past opposing side faces of said nozzle body, said piston and cylinder assembly being operatively connected at said one end to a portion of said actuator bar extending past a side face of said nozzle body.

19. The assembly of claim 17 wherein said first check valve is a spring biased valve and wherein said first and second check valves are positioned in said actuator bar fluid passage and said equalization line connects the ends of said actuator bar fluid passage.

20. The assembly of claim 19 wherein said actuator bar fluid passage has varying diameters, a first fluid passage section extending from said valve body fluid passage to said first spring biased check valve having a relatively small diameter, and a second fluid passage section extending from said valve body fluid passage to said second check valve having a relatively large diameter.

* * * * *